US012637816B1

(12) United States Patent
Maya

(10) Patent No.: US 12,637,816 B1
(45) Date of Patent: May 26, 2026

(54) TRAFFIC CONE TRAILER AND TOW ADAPTOR ASSEMBLY

(71) Applicant: Genoi Maya, Grand Prairie, TX (US)

(72) Inventor: Genoi Maya, Grand Prairie, TX (US)

( * ) Notice: Subject to any disclaimer, the term of this patent is extended or adjusted under 35 U.S.C. 154(b) by 1067 days.

(21) Appl. No.: 17/555,143

(22) Filed: Dec. 17, 2021

Related U.S. Application Data

(60) Provisional application No. 63/128,589, filed on Dec. 21, 2020.

(51) Int. Cl.
| | |
|---|---|
| *E01F 9/70* | (2016.01) |
| *B60D 1/01* | (2006.01) |
| *B60D 1/167* | (2006.01) |
| *B60D 1/58* | (2006.01) |

(52) U.S. Cl.
CPC .................. *E01F 9/70* (2016.02); *B60D 1/01* (2013.01); *B60D 1/167* (2013.01); *B60D 1/583* (2013.01)

(58) Field of Classification Search
CPC .. E01F 9/70; B60D 1/01; B60D 1/167; B60D 1/583; B62B 1/12; B62B 2203/10; B62B 2207/02; B62B 2501/065; B62B 3/001; B62B 3/02; B62B 3/08; B62B 5/0003; B62B 5/0046; B62B 5/0079; B62D 53/02; B62D 53/065; B62D 61/12; B62D 63/061; B60P 1/4485
USPC ...................................................... 180/423.1
See application file for complete search history.

(56) References Cited

U.S. PATENT DOCUMENTS

| | | | | |
|---|---|---|---|---|
| 4,219,141 | A | * | 8/1980 | Lovy .......................... E01F 9/70 |
| | | | | 116/28 R |
| 4,597,706 | A | | 7/1986 | Michit |
| 5,525,021 | A | | 6/1996 | Larguier |
| 6,726,434 | B2 | | 4/2004 | Orthaus et al. |
| 6,752,582 | B2 | | 6/2004 | Garcia |
| 7,306,398 | B2 | | 12/2007 | Doran, Jr. |
| 7,431,532 | B2 | | 10/2008 | Lidster |
| 7,845,670 | B2 | | 12/2010 | Oberg |

(Continued)

FOREIGN PATENT DOCUMENTS

| | | | |
|---|---|---|---|
| AU | 2016222424 A1 | | 3/2014 |
| CN | 110723452 A | * | 1/2020 |

(Continued)

*Primary Examiner* — Valentin Neacsu
*Assistant Examiner* — Nathaniel William Watkins
(74) *Attorney, Agent, or Firm* — John Rizvi; John Rizvi, P.A.—The Patent Professor®

(57) ABSTRACT

A traffic cone trailer and tow adaptor assembly suitable for storing, transporting and deployment of traffic cones includes an assembly platform which is transportable on a roadway surface. At least one elongated cone retention member is provided on the assembly platform which is dimensioned and configured to receive and retain one or more traffic cones stacked thereon. The traffic cone trailer may be stored with the stacked traffic cones deployed in place on corresponding cone retention members. The traffic cone trailer may be removed from the enclosure or storage location and pushed, pulled or towed on a roadway surface to transport the stacked traffic cones to a desired area of deployment on the roadway surface or other work area. The stacked traffic cones are individually removable from a corresponding cone retention member and deployed in place at the desired location or position at the work area.

20 Claims, 7 Drawing Sheets

(56)          References Cited

U.S. PATENT DOCUMENTS

| | | | |
|---|---|---|---|
| 8,047,384 B2 | 11/2011 | Mrowiec | |
| 8,056,919 B1 | 11/2011 | Huston et al. | |
| 9,771,695 B2 | 9/2017 | Betson | |
| 10,124,822 B2 | 11/2018 | Nielsen et al. | |
| 2002/0154947 A1 | 10/2002 | Farritor et al. | |
| 2002/0175496 A1* | 11/2002 | Novakowski | B65F 3/005 |
| | | | 280/504 |
| 2008/0084041 A1 | 4/2008 | Dukes | |
| 2008/0111329 A1 | 5/2008 | Brown et al. | |
| 2011/0000943 A1 | 1/2011 | Krebsbach | |
| 2012/0256385 A1 | 10/2012 | Pujol | |
| 2017/0190344 A1* | 7/2017 | Bengtzen | B62B 5/0079 |
| 2018/0195246 A1* | 7/2018 | Hanssen | G08B 5/006 |
| 2020/0039556 A1 | 2/2020 | Burch, V et al. | |

FOREIGN PATENT DOCUMENTS

| | | | |
|---|---|---|---|
| CN | 210276473 U | * | 4/2020 |
| DE | 102011001606 A1 | | 10/2011 |
| DE | 102014115730 | | 4/2015 |
| GB | 2309244 A | | 7/1997 |
| GB | 2421975 A | | 7/2006 |
| GB | 2479558 A | | 10/2011 |

* cited by examiner

TRAFFIC CONE TRAILER AND TOW ADAPTOR ASSEMBLY

CROSS-REFERENCE TO RELATED APPLICATIONS

This application claims the benefit of U.S. Provisional Patent Application Ser. No. 63/128,589 filed on Dec. 21, 2020, which is incorporated by reference herein in its entirety.

FIELD OF THE INVENTION

The present invention relates generally to traffic cones, and more particularly, to a traffic cone trailer and tow adaptor assembly suitable for securely and immovably storing, carrying, transporting and facilitating deployment of traffic cones on a roadway.

BACKGROUND OF THE INVENTION

Control of vehicle traffic is essential to the safety of highway construction and maintenance personnel and motorists. Accordingly, road safety markers are frequently used to route traffic through work zones on streets, roads, highways and interstates. Road safety markers are highly visible and include signs, barricades, traffic cones, barrels and the like. Road safety markers may be arranged to direct traffic around or through areas of road construction or maintenance.

Traffic cones are well known in the art and have been in use for many years. A conventional traffic cone may include a flat square base which rests on the ground. An elongated, tapered cone typically extends upwardly from the base. The cone is typically a bright, reflective orange color.

In typical use, traffic cones are successively arranged in adjacent relationship to each other to form one or more traffic lanes on a roadway surface. The traffic lanes form driving paths which route motorists away from or around obstacles, dangerous areas or construction sites. Upon completion of the project and restoration of the normal traffic lanes, the traffic cones are typically removed from the surface.

Traffic cones may be manually deployed in place on a roadway surface by traffic control employees. The traffic cones may be stacked in the bed of a service vehicle such as a utility or telephone truck. The vehicle may be incrementally driven ahead of the portion of the roadway on which the traffic cones are placed. Traffic control employees may individually lift each traffic cone from a traffic cone stack and place the traffic cone on the roadway surface in spaced-apart relationship to the previously placed cone.

When not in use, traffic cones may be stored in stacks which may be placed inside a semi-trailer box or other enclosure. When use is desired, personnel may lift and carry the traffic cone stacks from the enclosure to the bed of the utility truck from which the cones will be deployed. This procedure may require that the personnel walk back and forth between the enclosure in which the cones are stored to the utility truck until the sufficient number of traffic cones have been placed in the truck for the job.

The conventional method of loading traffic cones from an enclosure to a utility truck and removing the traffic cones from the utility truck and placing the cones on the roadway surface is typically slow and labor-intensive. Consequently, chronic back and other overuse injuries may result to those personnel who routinely perform the task. Moreover, traffic control personnel may inadvertently fall from the bed of the truck, potentially resulting in other work-related injuries.

Another limitation of the conventional method of stacking traffic cones in the bed of a utility truck for deployment on a roadway surface is that the cones may have a tendency to slide in the truck upon movement of the truck. Moreover, the cones may inadvertently fall from the truck and require retrieval.

Accordingly, there is need for a solution to one or more of the foregoing shortcomings in the current state of the art.

SUMMARY OF THE INVENTION

The present invention is directed to a traffic cone trailer and tow adaptor assembly suitable for storing, carrying, transporting and facilitating deployment of traffic cones on a roadway. The traffic cone trailer may include an assembly platform. The assembly platform may be transportable on a roadway surface. At least one cone retention member may be provided on the assembly platform. The at least one cone retention member may be suitably dimensioned and configured to receive and retain at least one, and typically, a stack of traffic cones. Accordingly, the traffic cone trailer, with the stacked traffic cones deployed in place on the cone retention members, may be stored in an enclosure or other storage location. The traffic cone trailer may be removed from the enclosure or storage location and pushed, pulled or towed on a roadway surface to transport the stacked traffic cones to a desired area of deployment on the roadway surface or other work area. The stacked traffic cones may be individually removed from each cone retention member and deployed in place at the desired location or position at the work area.

After use, the traffic cones may be lifted from the roadway surface and restacked on the cone retention member or members. The traffic cone trailer may be transported from the work area back to the enclosure or storage location. The traffic cones may remain in place on the cone retention member or members until subsequent transport and deployment to the same or another work area.

In an illustrative implementation of the invention, a traffic cone trailer assembly suitable for securely and immovably storing, carrying, transporting and facilitating deployment of traffic cones on a roadway may include a transportable assembly platform. At least one cone retention member may extend upwardly from the assembly platform. Each cone retention member may be suitably dimensioned and configured to receive and retain and support at least one, and typically, a plurality of stacked traffic cones. Accordingly, the traffic cone trailer assembly may be transportable from an enclosure or other storage location to a roadway surface or other work area. At the work area, the traffic cones may be individually lifted from each cone retention member and placed on the roadway or other surface. After use, the traffic cones may be removed from the surface and placed back on the cone retention member or members in the stacked configuration. The traffic cone trailer assembly may be transported from the work area back to the storage location. The traffic cones may remain in place on the cone retention member or members preparatory to subsequent transport and deployment to the same or another work area.

In a second aspect, the at least one cone retention member may include a plurality of cone retention members.

In another aspect, each cone retention member may have an elongated, inverted conical configuration.

In another aspect, each cone retention member may have a plurality of elongated retention member segments which extend from the assembly platform.

In another aspect, the plurality of elongated retention member segments of each cone retention member may include a pair of retention member side segments.

In another aspect, the retention member side segments may angle toward each other from the assembly platform to a retention member apex.

In another aspect, a retention member middle segment may extend from the assembly platform to the retention member apex between the retention member side segments.

In another aspect, a retention member base may be provided on the assembly platform, and the retention member side segments and the retention member middle segment may extend from the retention member base.

In another aspect, the assembly platform may be fitted with a plurality of platform wheels.

In another aspect, the assembly platform may be generally elongated and rectangular.

In another aspect, the assembly platform may include an upper platform surface and a lower platform surface, and the cone retention members may extend upwardly from the upper platform surface.

In another aspect, the assembly platform may have a front platform edge, a rear platform edge parallel to the front platform edge and a pair of parallel side platform edges extending from the front platform edge to the rear platform edge, and the lower platform surface and the upper platform surface may be bound by the front platform edge, the rear platform edge and the side platform edges.

In another aspect, at least one assembly handle may be provided on the assembly platform.

In another aspect, the assembly handle may include a pair of parallel, spaced-apart side handle members extending from the rear platform edge of the assembly platform and a handle grip member extending between the side handle members.

In another aspect, a towing frame may extend from the assembly platform for coupling to a towing vehicle.

In another aspect, the towing frame may include a pair of side towing frame members extending forwardly front the front platform edge of the assembly platform and a hitch coupling terminating the side towing frame members.

In another aspect, the towing frame may be pivotally attached to the assembly platform.

In another aspect, platform reflectors may be provided on the assembly platform.

In another aspect, handle reflectors may be provided on the assembly handle.

In another aspect, towing frame reflectors may be provided on the towing frame.

In another aspect, platform bumpers may be provided on the assembly platform.

In another aspect, the platform bumpers may be provided at respective corners of the assembly platform.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front". "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a traffic cone trailer and tow adaptor assembly, generally as shown as at 100 throughout the figures, suitable for securely and immovably storing, carrying, transporting and facilitating deployment of traffic cones on a roadway.

Figure 1:
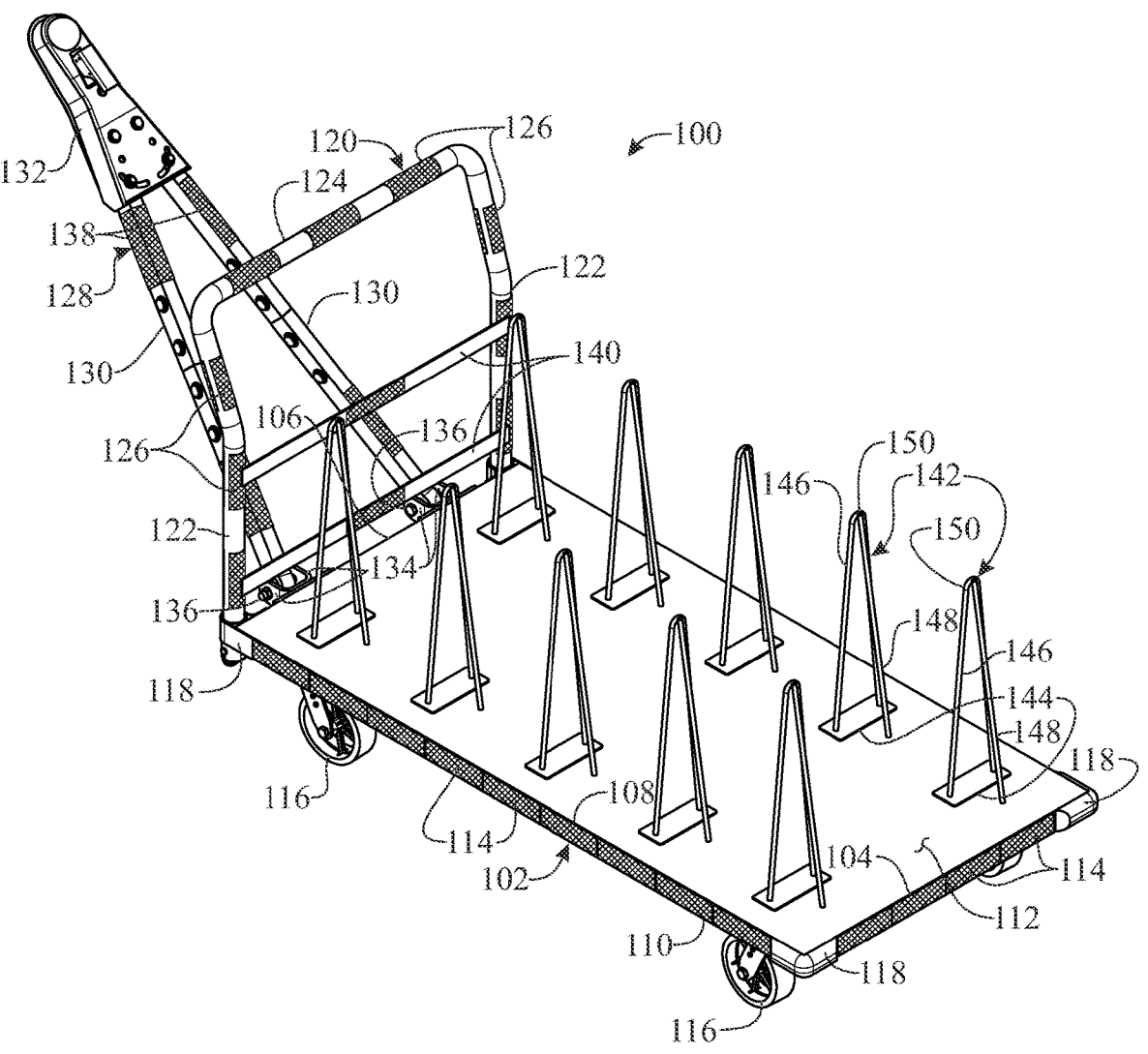
FIG. 1 presents a front perspective view of a traffic cone trailer and tow adaptor assembly in accordance with an illustrative embodiment of the present invention.

Referring initially to FIG. 1, presented therein is a perspective view of one illustrative embodiment of a traffic cone trailer and tow adaptor assembly 100 suitable for securely and immovably storing, carrying, transporting and facilitating deployment of traffic cones on a roadway in accordance with the present invention. As shown by way of example in FIG. 1, the assembly 100 may include an assembly platform 102. In some embodiments, the assembly platform 102 may be elongated and rectangular with a front platform edge 104, a rear platform edge 106 parallel to the front platform edge 104 and a pair of parallel, spaced-apart side platform edges 108 extending from the front platform edge 104 to the rear platform edge 106. A lower platform surface 110 and an upper platform surface 112 may be bounded by the front platform edge 104, the rear platform edge 106 and the side platform edges 108. In other embodiments, the platform assembly 100 may be circular or may have other geometric configurations including but not limited to polygonal or non-polygonal shapes.

In some embodiments, a plurality of platform reflectors 114 may be provided on the assembly platform 102. The platform reflectors 114 may be provided on the front platform edge 104, the rear platform edge 106 and the side platform edges 108. The platform reflectors 114 may render the assembly platform 102 visible in a dark environment typically as headlights of vehicles (not illustrated) illuminate the platform reflectors 114.

A plurality of platform wheels 116 may be provided on the lower platform surface 110 of the assembly platform 102. In some embodiments the platform wheels 116 may include a plurality of castor wheels. The platform wheels 116 may be provided at or proximate to the respective corners of the assembly platform 102.

In some embodiments, platform bumpers 118 may be provided on the assembly platform 102. The platform bumpers 118 may be provided at the respective corners of the assembly platform 102. Each platform bumper 118 may include a flexible or resilient, shock-absorbing material such as rubber, plastic, composite or combinations thereof, for example and without limitation.

In some embodiments, at least one assembly handle 120 may extend from the assembly platform 102. The assembly handle 120 may enable traffic control personnel (not illustrated) to push, pull and otherwise maneuver the assembly 100, and may have any design dimensioned and configured for the purpose. Accordingly, in some embodiments, the assembly handle 120 may include a pair of parallel, spaced-apart side handle members 122. The side handle members 122 may extend from the rear platform edge 106 of the assembly platform 102. A handle grip member 124 may extend between the side handle members 122. In some embodiments, each side handle member 122 may curve or angle rearwardly, as illustrated, to impart enhanced reach or gripping position capability to the assembly handle 120. At least one handle stabilizer 140 may extend between the side handle members 122 for reinforcing purposes.

In some embodiments, a plurality of handle reflectors 126 are provided on the assembly handle 120. The handle reflectors 126 may be provided on each of the side handle members 122 and the handle grip member 128. The handle reflectors 126 render the assembly handle 120 visible in a dark environment typically as headlights of vehicles (not illustrated) illuminate the handle reflectors 126.

Figure 7:
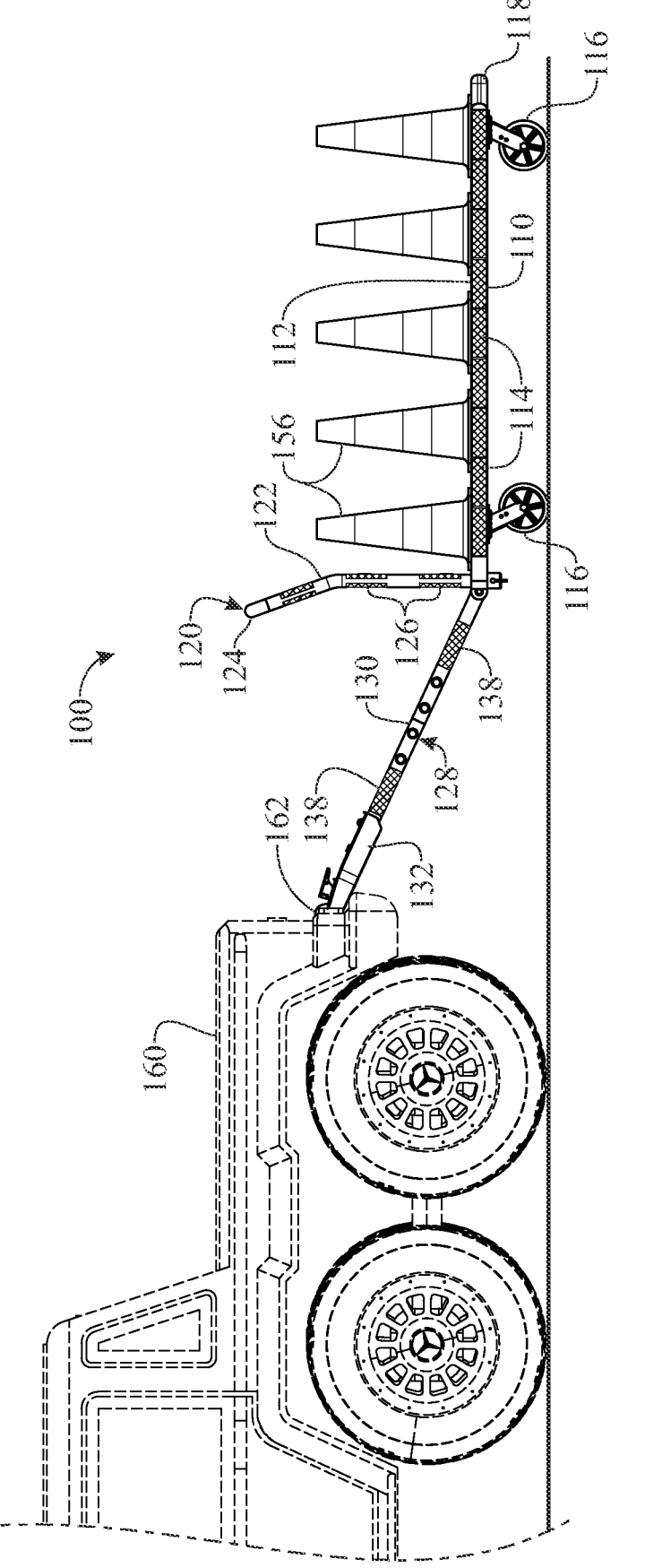
FIG. 7 presents a side elevation of the traffic cone trailer and tow adaptor assembly of FIG. 4, with a plurality of traffic cones placed on respective cone retention members and a towing frame coupled to a hitch on a towing vehicle, shown in dashed lines, in a typical towing transport of the assembly.

In some embodiments, at least one towing frame 128 is attached to and extends from the assembly platform 102. The towing frame 128 may facilitate coupling of the assembly 100 to a hitch 162 on a towing vehicle 160, such as is shown by way of example in dashed lines in FIG. 7, to facilitate towing transport of the assembly 100. The towing frame 128 may have any design dimensioned and configured for this purpose. Accordingly, in some embodiments, a pair of side towing frame members 130 may extend forwardly from the rear platform edge 106 of the assembly platform 102. In at least one embodiment, a hitch coupling 132 is attached to the extending or distal ends of the side towing frame members 130. In some embodiments, a hitch coupling 132 is dimensioned and configured to receive a standard hitch ball (not shown) of a hitch 162 of a towing vehicle 160. In other embodiments, a hitch coupling 132 may have alternative designs and configurations suitable for coupling engagement with a hitch 162.

In some embodiments, a towing frame 128 is pivotally attached to the assembly platform 102 according to the knowledge of those skilled in the art. Accordingly, two pairs of spaced-apart towing frame mount flanges 134 may extend from the rear platform edge 106 of the assembly platform 102. A proximal end of each side towing frame member 130 of the towing frame 128 may be disposed between each corresponding pair of the towing frame mount flanges 134. In at least one embodiment, a towing frame mount fastener 136 pivotally mounts each side towing frame member 130 between a corresponding pair of towing frame mount flanges 134.

In some embodiments, a plurality of towing frame reflectors 138 are provided on the towing frame 128. The towing frame reflectors 138 may be provided on each side towing frame member 130 of the towing frame 128. The towing frame reflectors 138 render the towing frame 128 visible in a dark environment.

Figure 2:
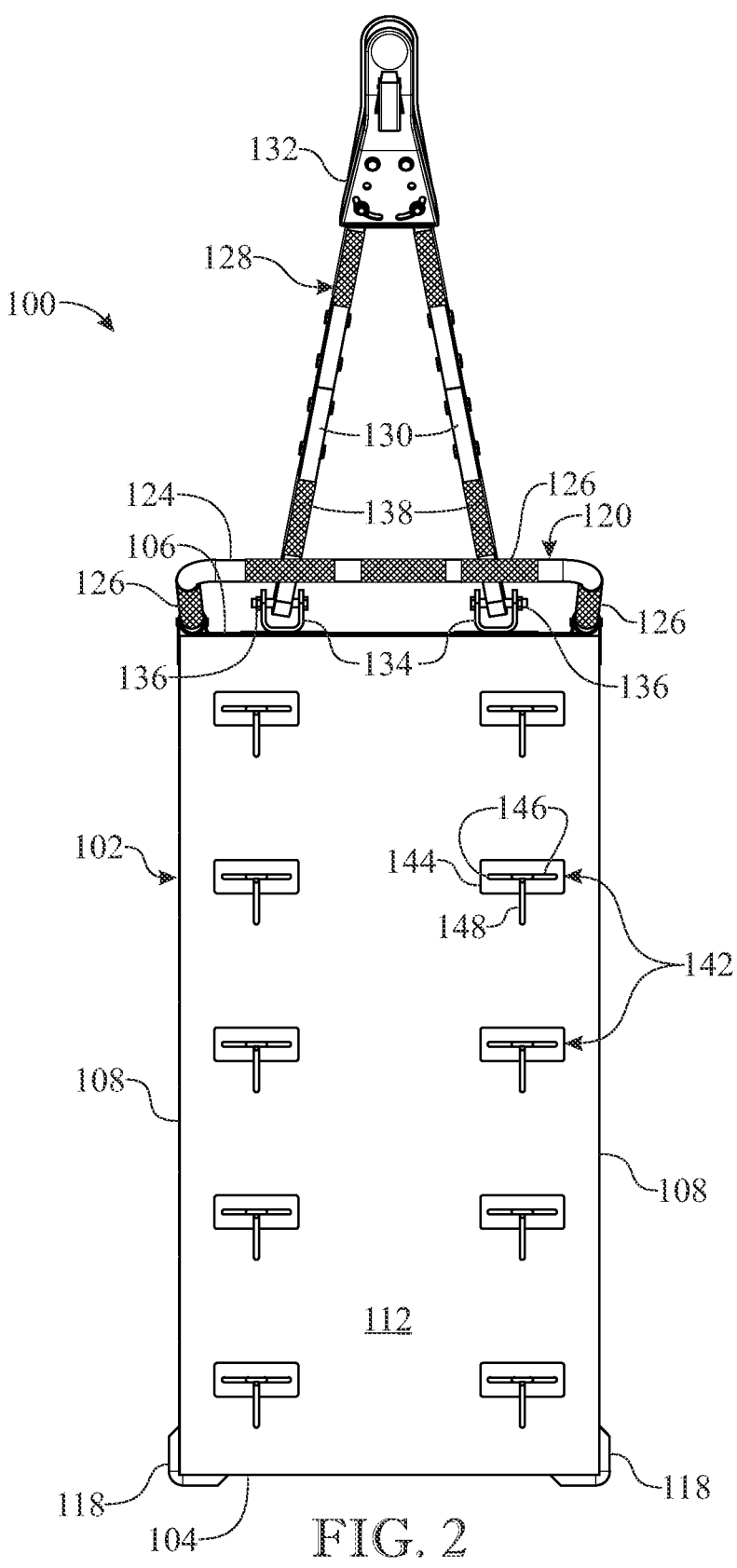
FIG. 2 presents a top plan view of the traffic cone trailer and tow adaptor assembly illustrated in FIG. 1.
Figure 3:
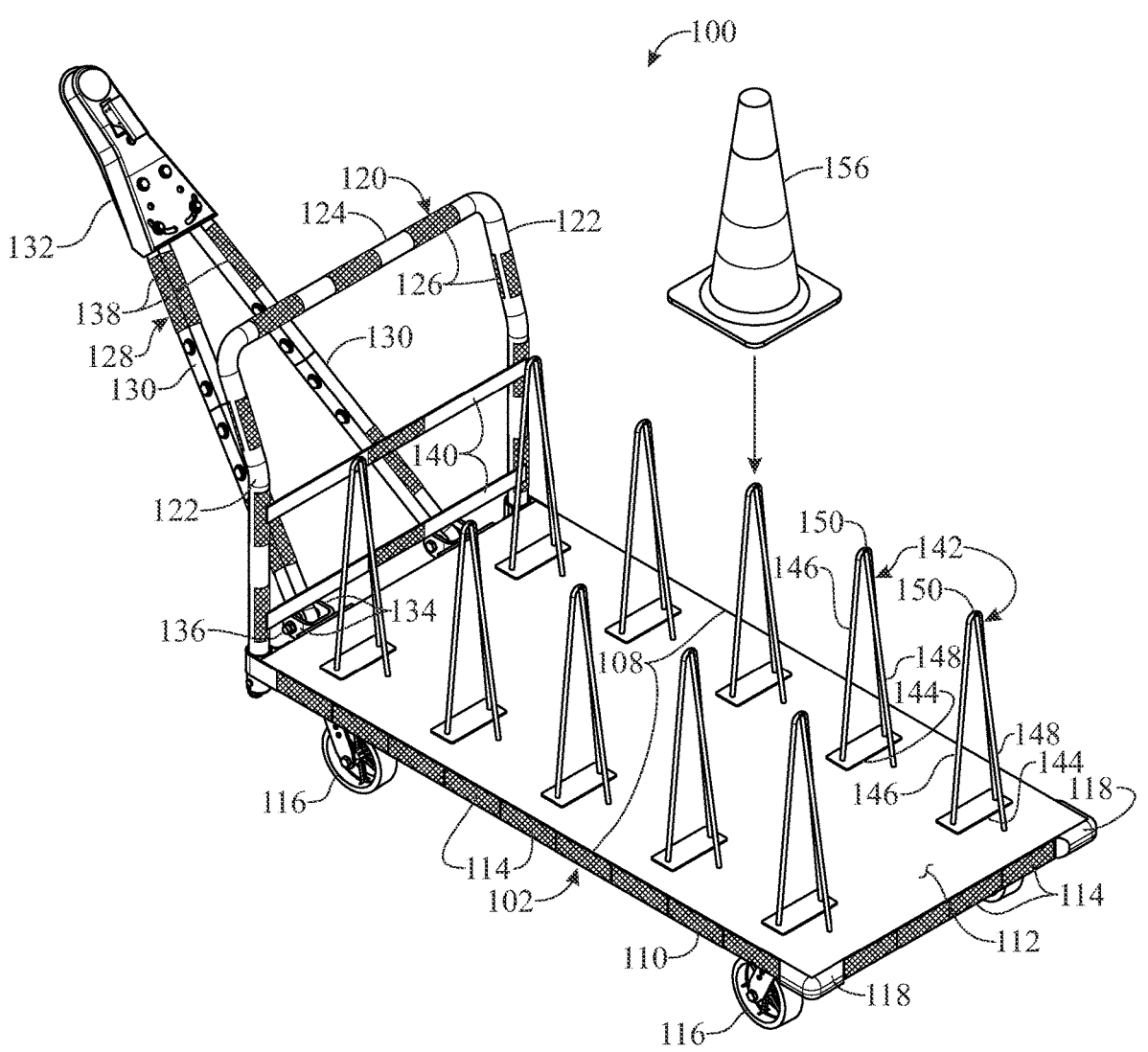
FIG. 3 presents an exploded perspective view of the traffic cone trailer and tow adaptor assembly illustrated in FIG. 1, more particularly illustrating typical placement of a traffic cone on a cone retention member of the assembly.
Figure 4:
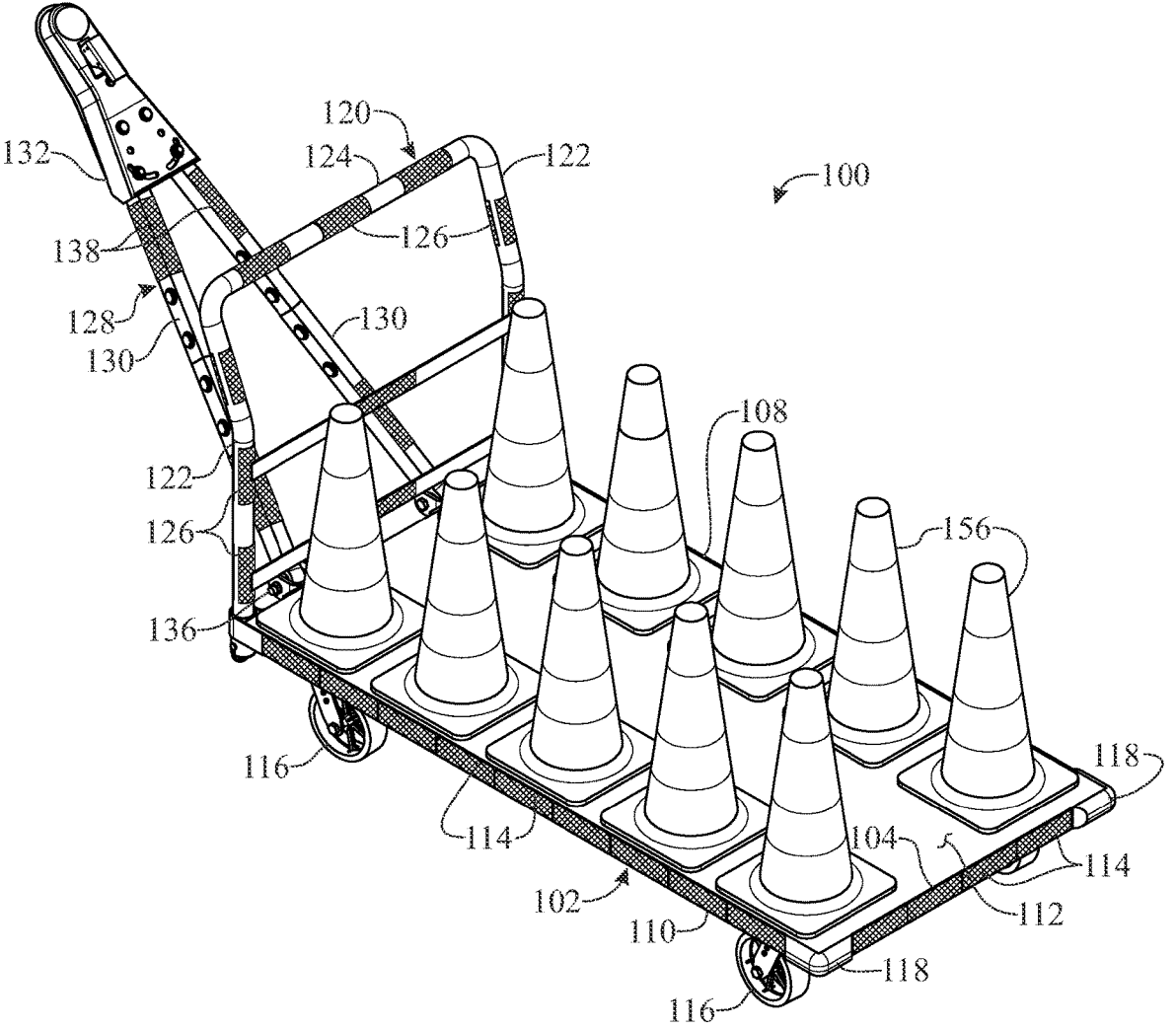
FIG. 4 presents a perspective view of the traffic cone trailer and tow adaptor assembly illustrated in FIG. 1, with a plurality of traffic cones placed on respective cone retention members.
Figure 5:
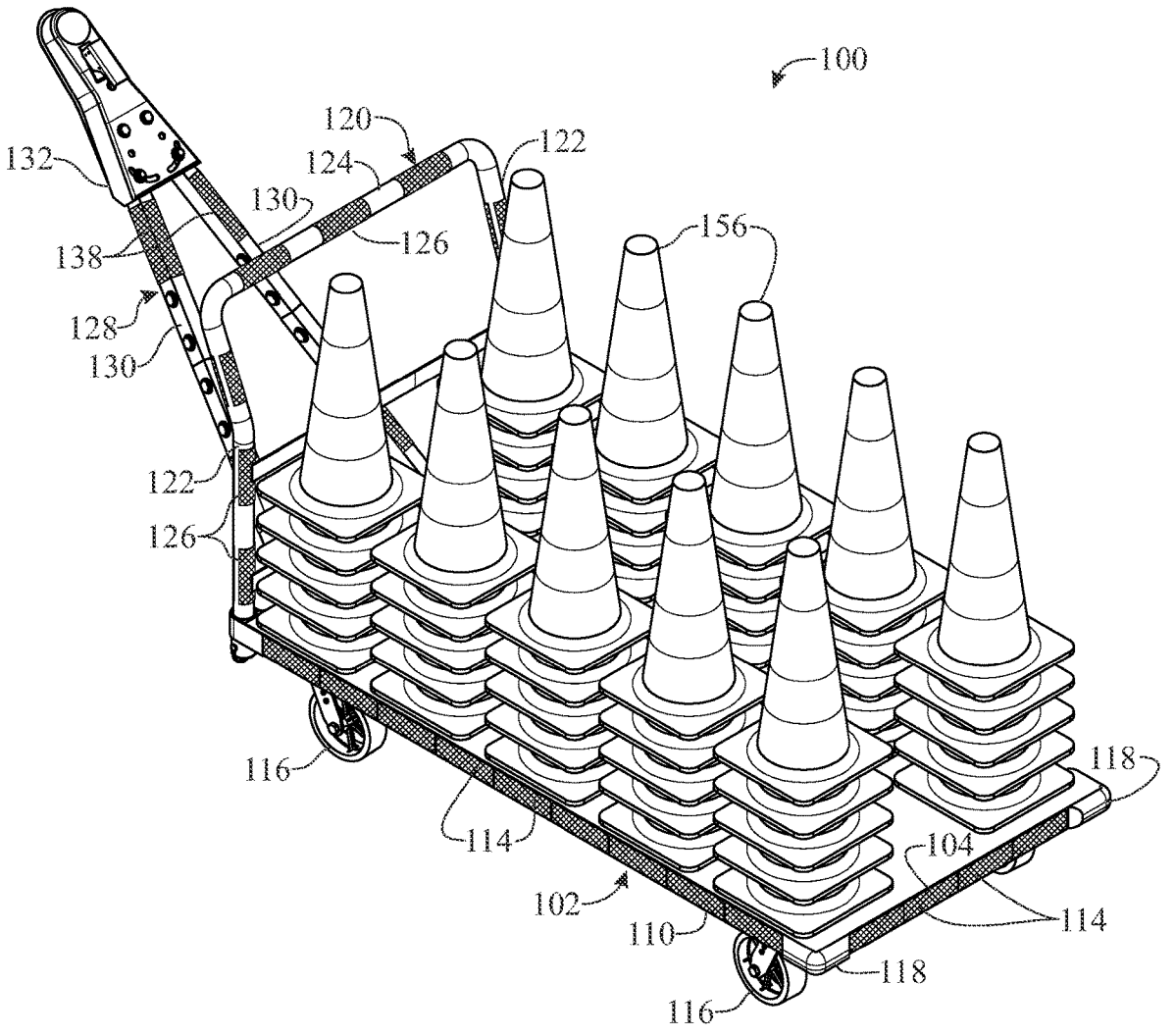
FIG. 5 presents a perspective view of the traffic cone trailer and tow adaptor assembly illustrated in FIG. 1, with a stack of traffic cones placed on each cone retention member.
Figure 6:
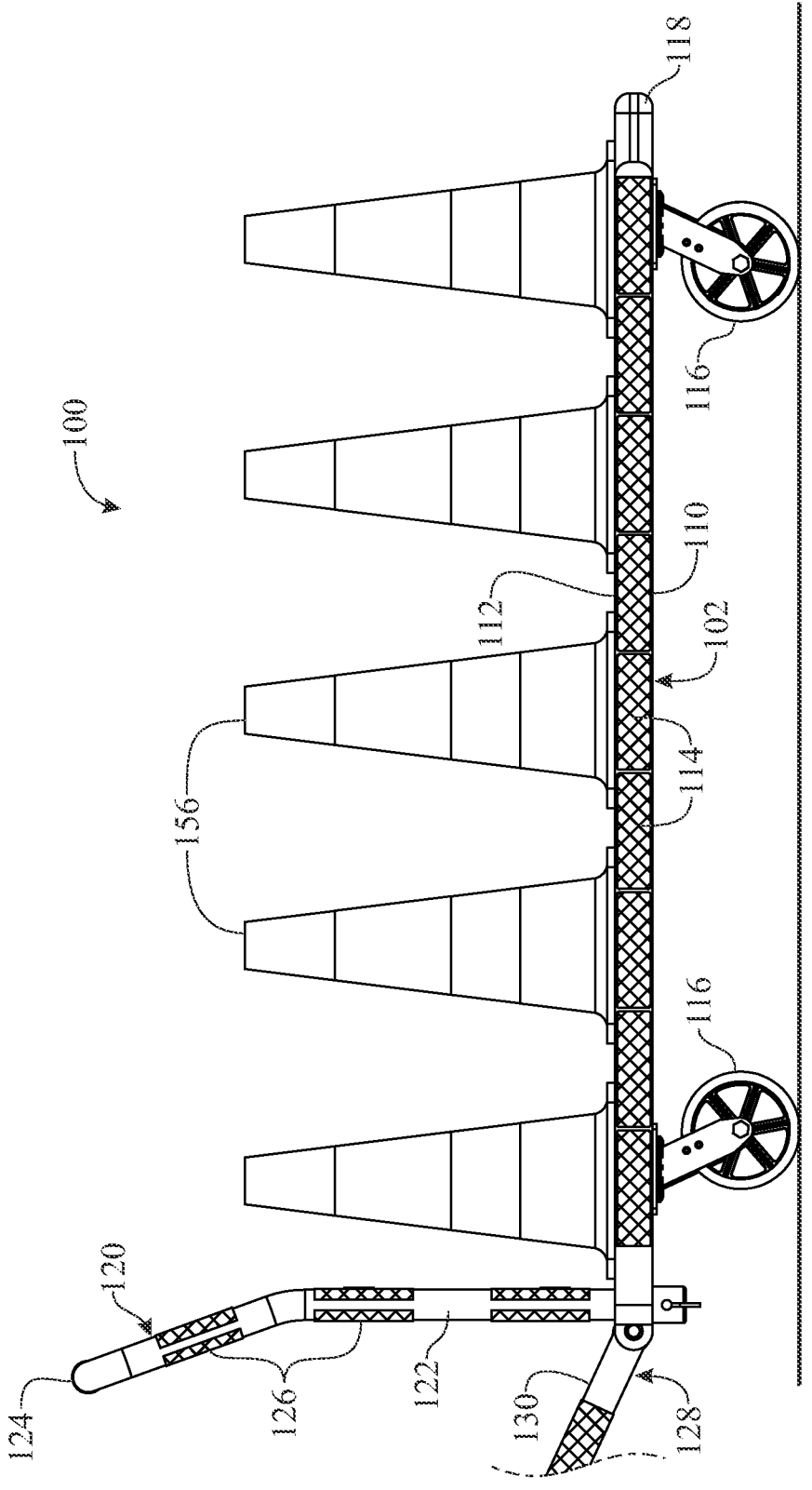
FIG. 6 presents a partial side elevation of the traffic cone trailer and tow adaptor assembly of FIG. 4, with a plurality of traffic cones placed on respective cone retention members.

At least one cone retention member 142 is provided on the assembly platform 102. As illustrated best in FIGS. 1 through 3, a plurality of cone retention members 142 are provided on the assembly platform 102. The cone retention members 142 extend upwardly from the upper platform surface 112 of the assembly platform 102 in a selected number and pattern or spacing. Each cone retention member 142 is dimensioned and configured to receive and retain at least one traffic cone 156 thereon, such as is shown best in FIG. 4, and in at least one embodiment, each cone retention member 142 is dimensioned and configured to receive and retain a stack of traffic cones 156 thereon, such as is shown best in FIG. 5.

Each cone retention member 142 may have a generally elongated, inverted conical configuration. In some embodiments, each cone retention member 142 has a plurality of elongated retention member segments 146, 148 which extend from the assembly platform 102. Accordingly, each cone retention member 142 may have a retention member base 144 provided on the upper platform surface 112 of the assembly platform 102. A pair of elongated retention member side segments 146 may extend upwardly from the retention member base 144. The retention member side segments 146 may angle toward each other from the retention member base 144 to a retention member apex 150. A retention member middle segment 148 may angle upwardly from the assembly platform 102 to the retention member apex 150 between the retention member side segments 146. As illustrated best in FIGS. 1 and 3, the retention member side segments 146 and the retention member middle segment 148 form the generally elongated, inverted conical configuration of each cone retention member 142.

In typical application, the assembly 100 may be transported from an enclosure or other storage location (not illustrated) to a roadway surface or other work area (not illustrated) in which road construction or maintenance is typically being undertaken. At the storage location, the assembly 100 may be stored with at least one traffic cone 156 positioned on each cone retention member 142, as shown by way of example in FIG. 4. Alternatively, a plurality of stacked traffic cones 156 positioned on each cone retention member 142, as shown by way of example in FIG. 5. A traffic control employee may utilize the assembly handle 120 to pull the assembly 100 from the storage location to a towing vehicle 160, as the assembly platform 102 will roll on the platform wheels 116. At the towing vehicle 160, the hitch coupling 132 on the towing frame 128 of the assembly 100 is coupled to a hitch 162 on the towing vehicle 160. The towing vehicle 160 may then be operated to tow the assembly 100 to a roadway work area.

At the roadway work area, traffic control personnel may lift the traffic cones 156 individually or as a stack from each cone retention member 142 and successively deploy the traffic cones 156 as needed on the roadway surface. The deployed traffic cones 156 form a barrier or traffic lane to guide or route motorists away from or around an obstacle, dangerous area and/or construction site. As the traffic cones 156 are removed from the assembly 100, the towing vehicle 160 may be slowly operated in the forward direction to incrementally tow or advance the assembly 100 along the portion of the roadway work area onto which the traffic cones 156 are to be deployed. In dark environments, the platform reflectors 114, handle reflectors 126 and towing frame reflectors 128 reflect light emitted by the headlights of vehicles not illustrated travelling along the roadway proximate the assembly 100.

Upon completion of the road construction or maintenance project, the traffic cones 156 are removed from the roadway surface throughout the work area, thereby restoring the normal traffic lanes. The traffic cones 156 are placed individually or in a stacked configuration on each cone retention member 142, after which, the towing vehicle 160 tows the assembly 100 and the plurality of traffic cones 156 staged thereon back to a storage location. At the storage location, the assembly 100 is disengaged from the towing vehicle 160, typically by uncoupling the hitch coupling 132 of the towing frame 128 from the hitch 162 on the towing vehicle 102. A traffic control employee may grasp the assembly handle 120 and push or pull the assembly 100 from the towing vehicle 160 to the storage location until the next time use of the assembly 100 is required.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A traffic cone trailer and tow adaptor assembly releasably couplable to a hitch of a towing vehicle for storing, carrying, transporting and deploying a plurality of traffic cones over and onto roadway surface, said assembly comprising:

an assembly platform having an upper surface and a lower surface;

a plurality of platform wheels operatively attached to said assembly platform support said assembly platform on the roadway surface; and at least one cone retention member secured to said upper surface of said assembly platform and extending upwardly therefrom, said at least one cone retention member having a generally elongated and inverted conical configuration to receive and securely and immovably store, carry, and/or transport at least one of the plurality of traffic cones thereon; and a towing frame mounted to and extending outwardly from a portion of said assembly platform is releasably coupleable to the hitch of the towing vehicle.

2. The assembly as recited in claim 1, wherein said assembly platform comprises a front platform edge, a rear platform edge parallel to said front platform edge and a pair of side platform edges extending from said front platform edge to said rear platform edge.

3. The assembly as recited in claim 1, wherein said at least one cone retention member comprises a plurality of elongated retention member segments which extend upwardly from said upper surface of said assembly platform.

4. The assembly as recited in claim 3, wherein said plurality of elongated retention member segments includes a pair of retention member side segments and a single retention member middle segment, wherein said single retention member middle segment is longer than each of said pair of retention member side segments.

5. The assembly as recited in claim 4, wherein said retention member side segments angle towards one other from said assembly platform to form a retention member apex therebetween.

6. The assembly as recited in claim 5, wherein said single retention member middle segment extends upwardly from said assembly platform at an angle and interconnects with said retention member apex formed between said retention member side segments.

7. The assembly as recited in claim 4, further comprising a retention member base attached to said upper surface of said assembly platform, said retention member side segments mounted to said retention member base.

8. The assembly as recited in claim 1, further comprising a plurality of cone retention members mounted on said upper surface of said assembly platform and extending upwardly therefrom, each of said plurality of cone retention members having a generally elongated and inverted conical configuration to receive and securely and immovably store, carry, and/or transport at least one of the plurality of traffic cones thereon.

9. The assembly as recited in claim 8, wherein each of said plurality of cone retention members comprises a pair of elongated retention member se segments which extend upwardly from said assembly platform to a corresponding retention member apex formed therebetween and a single elongated retention member middle segment which extends upwardly from said assembly platform at an angle and interconnects with said retention member apex formed between said plurality of elongated retention member side segments, wherein said single elongated retention member middle segment is longer than each of said pair of elongated retention member side segments.

10. The assembly as recited in claim 8, wherein each of said plurality of cone retention members is dimensioned and configured to receive and releasably retain at least some of the plurality of traffic cones disposed in a stacked orientation thereon.

11. The assembly as recited in claim 1, further comprising at least one assembly handle attached to said assembly platform.

12. The assembly as recited in claim 11, wherein said at least one assembly handle includes a pair of spaced-apart side handle members mounted to said assembly platform.

13. The assembly as recited in claim 12, wherein said at least one assembly handle further includes a handle grip member extending between and interconnecting said side handle members.

14. The assembly as recited in claim 1, wherein said towing frame extends outwardly from said assembly platform to further facilitate releasably coupling said assembly platform to the towing vehicle.

15. The assembly as recited in claim 14, wherein said towing frame comprises a pair of side towing frame members interconnected to and extending from said assembly platform, each of said towing frame members having a proximal end and an oppositely disposed distal end.

16. The assembly as recited in claim 15, wherein said proximal end of each of said side towing frame members is pivotally interconnected between a corresponding pair of towing frame mount flanges mounted to said assembly platform.

17. The assembly as recited in claim 16, wherein a hitch coupling is attached to said distal end of each of said side towing frame members, each said hitch coupling dimensioned and configured to releasably receive the hitch of the towing vehicle therein.

18. A traffic cone trailer and tow adaptor assembly releasably couplable to a towing vehicle for storing, carrying, transporting and deploying a plurality of traffic cones onto and over a roadway surface, said assembly comprising:

an assembly platform having an upper surface and a lower surface at least partially defined by a plurality of platform edges extending therearound;

a plurality of platform wheels operatively attached to said assembly platform support said assembly platform on the roadway surface;

a plurality of cone retention members mounted on said upper surface of said assembly platform, each of said plurality of cone retention members having a generally elongated and inverted conical configuration to receive and securely and immovably store, carry, and transport at least one of the plurality of traffic cones thereon; and each of said plurality of cone retention members comprises a pair of retention member side segments extending upwardly from said upper platform surface to a corresponding retention member apex formed therebetween and a single retention member middle segment extending upwardly from said assembly platform at an angle and interconnected to said retention member apex formed between said pair of retention member side segments, wherein said single retention member middle segment is longer than each of said pair of retention member side segments; and a towing frame mounted to and extending outwardly from a portion of said assembly platform, said assembly platform is releasably coupleable to the towing vehicle via said towing frame.

19. The assembly as recited in claim 18, further comprising a plurality of platform reflectors mounted on at least one of said plurality of edges of said assembly platform.

20. A traffic cone trailer and tow adaptor assembly releasably couplable to a towing vehicle for storing, carrying, transporting and deploying a plurality of traffic cones over and onto a roadway surface, said assembly comprising:

an assembly platform having an upper surface and a lower surface at least partially defined by a front platform edge, a rear platform edge parallel to said front platform edge and a pair of parallel side platform edges extending from said front platform edge to said rear platform edge;

a plurality of platform reflectors mounted along each of said front platform edge, said rear platform edge, and each of said side platform edges of said assembly platform;

a plurality of platform wheels operatively attached to said assembly platform support said assembly platform on the roadway surface;

a plurality of cone retention members mounted on said upper surface of said assembly platform and extending upwardly therefrom, each of said plurality of cone retention members having a generally elongated and inverted conical configuration to receive and securely and immovably store, carry and/or transport at least some of the plurality of traffic cones thereon;

each of said plurality of cone retention members comprises a pair of elongated retention member side segments extending upwardly from a retention member base attached to said upper surface of said assembly platform to a corresponding retention member apex formed therebetween and a single elongated retention member middle segment extending upwardly from said upper surface of said assembly platform at an angle and interconnected to said retention member apex formed between said plurality of elongated retention member side segments, wherein each said single elongated retention member middle segment is longer than each of said pair of elongated retention member side segments; and a towing frame pivotally mounted to and extending outwardly from a portion of said assembly platform is releasably couplable to the hitch of the towing vehicle.

* * * * *